(12) United States Patent
Kondo

(10) Patent No.: US 6,324,975 B1
(45) Date of Patent: Dec. 4, 2001

(54) COLOR CORRECTING METHOD

(75) Inventor: Hirokazu Kondo, Minamiashigara (JP)

(73) Assignee: Fuji Photo Film Co., Ltd., Kanagawa-Ken (JP)

(*) Notice: Subject to any disclaimer, the term of this patent is extended or adjusted under 35 U.S.C. 154(b) by 0 days.

(21) Appl. No.: 09/646,400
(22) PCT Filed: Jan. 17, 2000
(86) PCT No.: PCT/JP00/00174
  § 371 Date: Sep. 18, 2000
  § 102(e) Date: Sep. 18, 2000
(87) PCT Pub. No.: WO00/42764
  PCT Pub. Date: Jul. 20, 2000

(30) Foreign Application Priority Data

Jan. 18, 1999 (JP) .................................... 11-009875

(51) Int. Cl.$^7$ ................................ B41F 1/10; B41F 1/34
(52) U.S. Cl. .............................. 101/171; 101/484; 400/74
(58) Field of Search ........................... 101/171, 484; 400/74

(56) References Cited

U.S. PATENT DOCUMENTS 5,333,069 * 7/1994 Spence ................................ 358/517

FOREIGN PATENT DOCUMENTS

| 64-61172 | 3/1989 | (JP) | ................................ H04N/1/40 |
| 3-56832 | 3/1991 | (JP) | ................................ G01J/3/50 |
| 6-326861 | 11/1994 | (JP) | ................................ H04N/1/40 |
| 8-511141 | 11/1996 | (JP) | ................................ H04N/1/60 |
| 10-155095 | 6/1998 | (JP) | ................................ H04N/1/60 |

\* cited by examiner

*Primary Examiner*—John S. Hilten
*Assistant Examiner*—Charles H. Nolan, Jr.
(74) *Attorney, Agent, or Firm*—Sughrue, Mion, Zinn, Macpeak & Seas, PLLC

(57) ABSTRACT

The colors of a print as a target are easily and reliably equalized with the colors of a proof generated by a proofer. A printed color chart Cpa is colorimetrically measured by a colorimeter, and an original printing profile as a target for converting CMYK image data into colorimetric data is produced. Then, using the original printing profile and a printer profile, a color chart Cpa' of the proof is outputted from a printer based on the CMYK image data. The color chart Cpa' is colorimetrically measured to generate a printing color reproduction profile. In the printing color reproduction profile, weighting is set in view of color reproduction ranges of a printing press and the printer, and a corrected printing profile is generated. The corrected printing profile and the printer profile are set as a color converting means. It is possible to perform easily corrected color matching by using the corrected color converting means.

20 Claims, 11 Drawing Sheets

COLOR CORRECTING METHOD

TECHNICAL FIELD

The present invention relates to a color correcting method preferably applicable to a printing proof generating system for generating a color printing proof (also referred to as "printing proof" or "proof") which comprises a proof color image on a proof sheet, with a printing proofer (also referred to as "proofer") such as a color printer or the like before a color print is produced on a print sheet by a color printing press such as a rotary press or the like.

BACKGROUND ART

Heretofore, before a color print which comprises a color image as a halftone dot image formed on a print sheet as a final product is produced by a color printing press, it is customary to generate a proof for proofing colors with a printing proofer such as a color printer or the like as an image output device.

The printing proofer is used because it can produce a hardcopy comprising a color image on a proof sheet (recording sheet), i.e., a proof, easily a plurality of times in a short period of time without the need for plate films and presensitized plates (PS plates) as is the case with printing presses.

In order to form a proof color image on a proof sheet, image data depending on a device [printing mediums (inks, printing presses, sheets, etc.), photos, image sensors, CRTs, LEDs, etc.], e.g., CMYK (cyan, magenta, yellow, black) image data, is converted into colorimetric data as device-independent image data, e.g., Lab image data or XYZ image data mathematically compatible therewith, by a standard printing profile (four-dimensional look-up table) given by a manufacturer or the like. Thereafter, the colorimetric data is converted into device-dependent image data for a color printer, e.g., RGB (red, green blue) image data, by a printing proofer profile (hereinafter referred to as "proofer profile"), e.g., a printer profile (three-dimensional look-up table). Using the device-dependent image data, a proof with a color image formed on a proof sheet is generated by a color printer (also referred to as "proofing printer").

The colors of a print to be produced by the printing press can be simulated by the proof generated by the color printer, so that the colors can be confirmed before they are actually printed.

Actually, the color reproduction range of the printing press and the color reproduction range of the printing proofer are different from each other. Therefore, a range that cannot be reproduced by the printing proofer is achieved by linking the printing profile and the proofer profile according to gamut mapping (color reproduction range mapping).

When a proof whose colors correspond to those of a print as a target is outputted from the printing proofer using the profiles thus linked, if the proof does not have sufficient color agreement, then the device-dependent image data CMYK are subjected to fine gradation adjustments (tone curve adjustments) prior to using the linked profiles.

However, such fine gradation adjustments are tedious and time-consuming because it is not clear as to what and how color shifts have to be corrected, and are also problematic in that some color shifts cannot be corrected by fine gradation adjustments.

The present invention has been made in view of the above drawbacks. It is an object of the present invention to provide a color correcting method which is capable of equalizing the colors of a proof produced by a proofer with the colors of a print as a target easily, reliably, and more accurately.

DISCLOSURE OF THE INVENTION

According to the present invention, there is provided a color correcting method for converting input image data depending on printing conditions into colorimetric data with a printing profile, thereafter converting the colorimetric data into image data depending on proofer conditions with a proofer profile, and outputting a proof from a proofer based on the image data to simulate color reproduction accuracy, comprising the steps of:

converting image data depending on the printing conditions to output a printing color chart colorimetrically measured when the printing profile is produced, into image data depending on the proofer conditions via the printing profile and the proofer profile;

supplying the image data to the proofer to output a proof color chart from the proofer;

colorimetrically measuring the proof color chart to generate a printing color reproduction profile to be simulated by the proofer;

determining differences between the printing color reproduction profile and the printing profile with respect to an entire color space of the input image data depending on the printing conditions; and correcting the colorimetric data with the determined differences.

With the arrangement of the present invention, a color chart for generating a printing profile is outputted as a proof from a printing proofer. As with an original printing profile, the proof is colorimetrically measured to determine a conversion relationship between image data depending on proof conditions and colorimetric data, i.e., a printing profile (printing color reproduction profile). Differences between the printing profile and the printing color reproduction profile determined from the proof are determined with respect to an entire color space of input image data depending on printing conditions, and used to correct colorimetric data outputted from the printing profile.

By thus correcting the colorimetric data, adjustments of tone curves of respective colors are not required, and the colors of the proof can easily and reliably be equalized with the colors of a print.

In the step of correcting the colorimetric data with the determined differences, the determined differences may be added to the original printing file (actually, the determined differences subtracted from the original printing file as their sign is inverted), producing a corrected printing profile. By using the corrected printing profile, a memory or the like as a storage means is not excessively used, and adjustments of tone curves of respective colors are not required, with the result that the colors of the proof can easily and reliably be equalized with the colors of a print.

The determined differences may be multiplied by a weighting coefficient depending on values of the input image data depending on the printing conditions in the entire color space, and the differences multiplied by the weighting coefficient may be added to the printing profile to correct the printing profile. The colors of the proof can more accurately be equalized with the colors of a print.

Rather than determining the differences between the printing color reproduction profile and the printing profile with respect to the entire color space of the input image data depending on the printing conditions, the differences may be determined with respect to an entire colorimetric color space which is a color space of the colorimetric data to correct the image data depending on the proofer conditions using the determined differences, rather than correcting the colorimetric data.

Corrected colorimetric data in the colorimetric color space may be determined from the determined differences and the printing profile, the proofer profile may be corrected with the corrected colorimetric data, and the image data depending on the proofer conditions may be corrected with the corrected proofer profile. In this manner, a proof which matches a print as a target can be outputted from the proofer by only correcting the proofer profile without correcting the printing profile.

Corrected colorimetric data in the colorimetric color space may be determined from the determined differences and the printing profile, the proofer profile may be corrected with corrected colorimetric data produced by multiplying the determined corrected colorimetric data by a weighting coefficient depending on the colorimetric color space, and the image data depending on the proofer conditions may be corrected with the corrected proofer profile. In this fashion, the colors of a proofer can possibly be equalized more accurately with the colors of a print as a target.

According to the present invention, furthermore, differences between colorimetric data produced by colorimetrically measuring the proof color chart and colorimetric data of the printing color chart may be determined with respect to an entire color space of the input image data depending on the printing conditions, and the colorimetric data may be corrected with the determined differences.

According to the present invention, it is not necessary to produce a printing color reproduction profile.

Even in the above arrangement, the printing profile may be corrected by the differences, and the colorimetric data may be corrected with the corrected printing profile.

The differences may be multiplied by a weighting coefficient depending on values of the input image data depending on the printing conditions in the entire color space, the differences multiplied by the weighting coefficient may be added to the printing profile to correct the printing profile, and the colorimetric data may be corrected with the corrected printing profile.

The weighting coefficient may have a value of 1 in a color reproduction range of the printing proofer, and a value of 0 outside the color reproduction range. Alternatively, the weighting coefficient may have a value of 1 in a color reproduction range of the printing proofer, and may be gradually reduced from the value of 1 in a direction away from the color reproduction range. The colors of a proofer can possibly be equalized much more accurately with the colors of a print as a target.

BEST MODE FOR CARRYING OUT THE INVENTION

The present invention will be described below with reference to the drawings.

Figure 1:
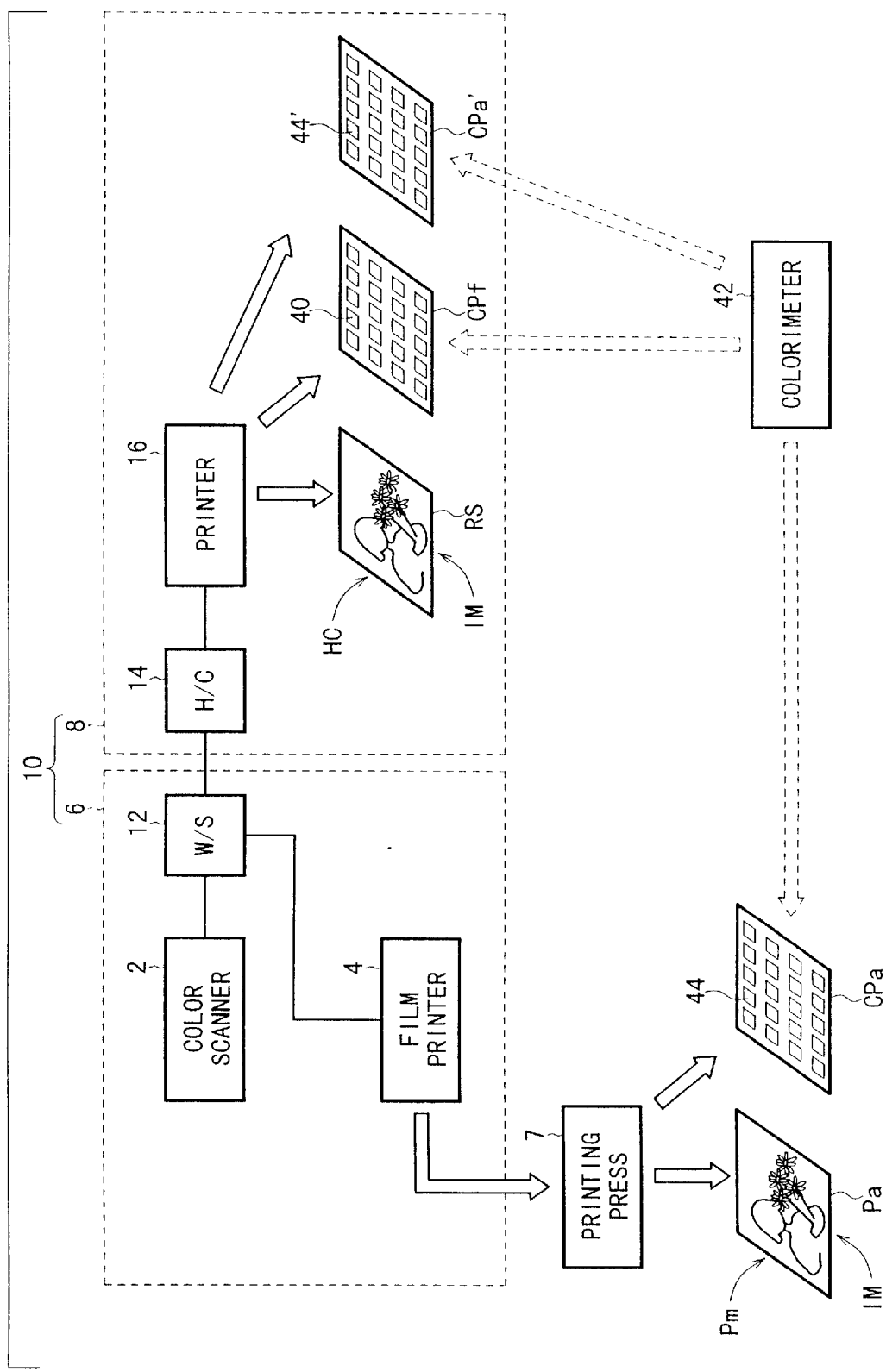
FIG. 1 is a block diagram of an arrangement including a printing proof generating system to which the present invention is applied.

FIG. 1 shows a schematic overall arrangement of a printing proof generating system 10 to which the present invention is applied.

The printing proof generating system 10 basically comprises an electronic page make-up apparatus 6 and a color image recording apparatus 8 which are connected to each other by a communication interface such as Ethernet.

The electronic page make-up apparatus 6 includes a workstation (W/S) 12 as an electronic page make-up apparatus proper. To the workstation 12, there are connected a color scanner 2 functioning as an image input device and a film printer 4 for outputting film plates of 4 CMYK plates.

The color image recording apparatus 8 comprises a host computer (H/C) 14 storing a printing profile and a printer profile, described later on, and chiefly functioning as a color converting means, and a printer 16 functioning as a proof image output device (also referred to as "proof output device", "printing proofer", or "proofer").

Each of the workstation 12 and the host computer 14 comprises a display unit as a display device (not shown), a main body having a CPU, memory (storage means), etc., and an input device including a keyboard and a mouse.

The color scanner 2 connected to the workstation 12 reads a subject image placed on a block copy base sheet (not shown) marked with lines indicative of a range for inserting characters and photos, reads color images of pictures, characters, graphic patterns, etc. from other subject images, and sends image data as separated into four colors (CMYK) (device-dependent image data) to the workstation 12.

The workstation 12 displays the image of the block copy base sheet read by the color scanner 2 on the display unit. The user elecronically makes up an image based on the image data on the image of the block copy base sheet using the keyboard and the mouse, thereby generating one page of an elecronically made-up image, i.e., an imposed pattern.

The workstation 12 supplies data representative of the imposed pattern to the film printer 4. The film printer 4 outputs CMYK printing film plates of high image quality corresponding to the imposed pattern data.

Usually, printing plates are produced from the printing film plates, and mounted on a rotary press, i.e., a printing press 7, and coated with inks. The inks coated on the printing plates are transferred to a printing sheet Pa, thus completing a color print Pm with an image IM formed thereon.

The process of producing the color print Pm with the printing press 7 is a highly large-scale process and very costly. Therefore, the color image recording apparatus 8 as a color printing proofer is used for the purpose for confirming the finish of the color print Pm before it is actually printed by the printing press 7.

The image that has been edited and made up using the workstation 12 is supplied as PDL (Page Description Language) data which is description language data (image data according to a description language) descriptive of one page of image information including positional information, color information (including density information), etc., to the host computer 14.

The host computer 14 effects a color converting process on the supplied image data, and supplies the processed data to the printer 16.

Based on the supplied image data, the printer 16 outputs a hardcopy HC. In the embodiment, the hardcopy HC comprises an image reception sheet RS with an image IM formed thereon.

Figure 2:
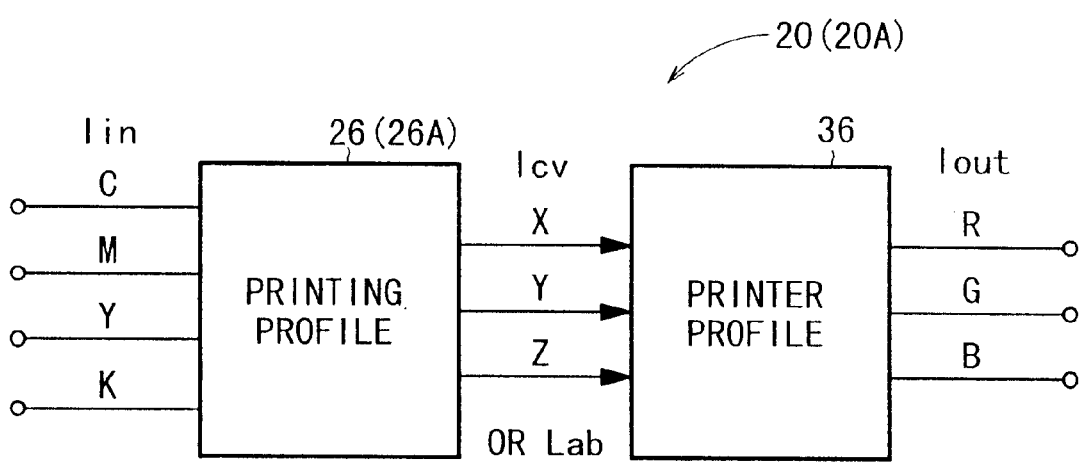
FIG. 2 is a block diagram of a color converting means.

It FIG. 2 schematically shows main functions of the host computer 14. The host computer 14 functions as a color converting means 20. Specifically, the host computer 14 decodes the PDL data supplied from the workstation 12 with a non-illustrated raster image processor (RIP) into bit map data as CMYK image data (device-dependent image data) which are scanning image data.

The CMYK image data are supplied to the color converting means 20 in which a printing profile 26 and a printer profile 36, each comprising a color converting LUT (Look-UP Table), are set.

The color converting means 20 converts the supplied device-dependent image data, i.e., image data depending on printing conditions, e.g., image data of the colors CMYK as halftone dot % data Iin=Iin (C, M, Y, K), into device-depending image data, i.e., image data depending on proofer conditions [in the embodiment, image data depending on printer conditions, e.g., image data of the colors RGB (hereinafter referred to as "RGB image data") Iout=Iout (R. G, B)], and outputs the device-depending image data to the printer 16.

The standard printing profile 26 of the color converting means 20 converts the supplied image data Iin (C, M, Y, K) of the colors CMYK into XYZ colorimetric data Icv=Icv (X, Y, Z) as device-independent image data.

The printing profile 26 may comprise a printing profile for converting the image data Iin, not into XYZ colorimetric data Icv, but into Lab colorimetric data Icv=Icv (L, a, b) that are mathematically compatible with the XYZ colorimetric data Icv.

The XYZ colorimetric data Icv converted by the printing profile 26, i.e., device-independent image data, are converted into RGB image data Iout=Iout (R, G, B) as device-dependent image data by the printer profile 36 as a printer color converting means of the color converting means 20.

Four look-up tables (LUT) for one-dimensionally converting the gradations of the image data Iin of the colors CMYK, respectively, may be inserted in a stage preceding the printing profile 26. Furthermore, if a desired print sheet rather than a standard print sheet is to be used, one-dimensional LUTs for the respective colorimetric values XYZ may be inserted in a stage following the printing profile 26 for compensating for the difference between the sheet colors (base colors) of the sheets.

When the RGB image data Iout converted by the printer profile 36 of the color converting means 20 are supplied from the host computer 14 to the printer 16 as shown in FIG. 1, the hardcopy HC as the proof with the image IM formed on the image reception sheet RS is outputted from the printer 16.

In the embodiment, the printer 16 comprises a printer which scans a photosensitive material, not shown, with RGB laser beams emitted with respect to the respective RGB image data Iout and modulated in intensity depending on the RGB image data Iout, forming a latent image on the photosensitive material, coating water on the photosensitive material on which the latent image has been recorded, applies the photosensitive material to the image reception sheet RS, thermally developing and transferring a visible image onto the image reception sheet RS.

Figure 3:
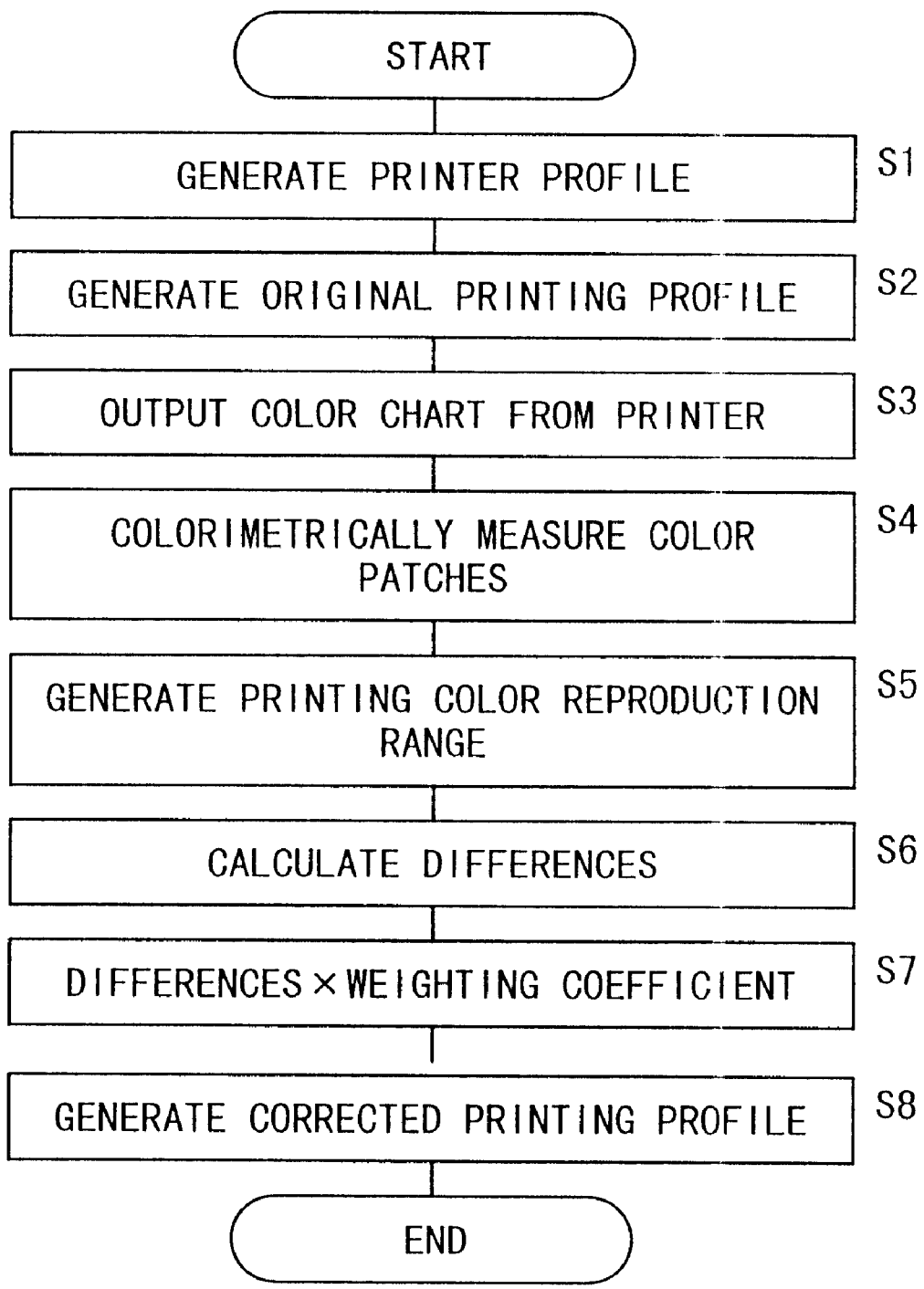
FIG. 3 is a flowchart of an operation sequence of the printing proof generating system.

A process of generating the standard printing profile (hereinafter referred to as "raw printing profile" or "original printing profile") 26 set in the color converting means 20, and a process of correcting the original printing profile 26 will be described below with reference to a process chart shown in FIG. 3 (first embodiment).

The printer profile 36 needs to be proofed in order to correct the original printing profile 26. The proofed printer profile 36 is generated as follows: Each of the colors RGB of the RGB image data Iout supplied to the printer 16 is changed in given notches ranging from 0 to a maximum value (e.g., 255), and color patches 40 composed of combinations of the colors RGB are formed on the image reception sheet RS thereby to generate a color chart Cpf as shown in FIG. 1.

The color patches 40 on the color chart Cpf are measured by a colorimeter 42 to determine XYZ colorimetric data, and a conversion table for conversion between the RGB image data and the XYZ colorimetric data (or the Lab colorimetric data) is generated. The conversion table is inversely converted and interpolated to determine an LUT for converting XYZ colorimetric data (the colorimetric data Icv in FIG. 2) into RGB image data Iout. The determined LUT is set as the printer profile 36 in step S1.

The process of correcting the original printing profile 26 will be described below. The original printing profile 26 is a colorimetric table where CMYK halftone dot % data are changed in certain notches. For example, for generating a colorimetric table where CMYK halftone dot % data are changed in 10% notches, it is necessary to determine colorimetric values for $11^4$=14641 colors produced when the halftone dot % data of the four colors CMYK are changed in the notches of 0, 10, . . . , 100%. Actually, films of characteristic several hundreds of these colors are produced by the film printer 4, after which printing plates are produced. Using the printing plates, a color chart Cpa (see FIG. 1) of color patches 44 is printed on the standard print sheet Pa with standard inks by the printing press 7. The color patches 44 are then colorimetrically measured by the colorimeter 42 to generate a colorimetric table in 10% notches, i.e., the standard original printing profile 26 [a nonlinear four-dimensional (four-dimensional-to-three dimensional conversion) LUT for converting CMYK printing image data Iin (C, M, Y, K) into colorimetric data Icv (X, Y, Z) in FIG. 2] in step S2.

Halftone dot % data C, M, Y, K of the printing image data Iin=Iin (C, M, Y, k) are supplied to the original printing profile 26, which converts the supplied data into XYZ colorimetric data Icv=Icv (X, Y, Z).

As described above, the original printing profile 26 needs a highly large-scale colorimetric process for achieving a high conversion accuracy. Usually, manufacturers provide the standard original printing profile 26. The term "standard" means use of various paper types including art paper, coat paper, matted paper, wood-free paper, etc., two or three types of inks having a high market share, and a printing press 7 having a high market share which is used at normal temperature.

In order to generate the original printing profile 26, a color chart Cpa' similar to the printed color chart Cpa is outputted from the printer 16 in step S3.

CMYK halftone dot % data used when the color chart Cpa is generated are uniquely converted by the host computer 14 into CMYK image data as scanning image data (stated otherwise, device-dependent image data for outputting the color chart Cpa colorimetrically measured when the original printing profile 26 was produced). The converted CMYK image data are converted into RGB image data Iout which are proofer device-depending image data via the original printing profile 26 and the printer profile 36. Based on the RGB image data Iout, the printer 16 outputs the color chart Cpa' having the same array of color patches 44' as the color patches 44 on the printed color chart Cpa.

As with the original printing profile 26, the color patches 44' of the color chart Cpa' are colorimetrically measured to obtain colorimetric values XYZ in step S4.

From the color patches 44' of the color chart Cpa', a conversion relationship between the CMYK image data of the printer 16 as a printing proofer and colorimetric values is determined thereby to determine a printing color reproduction profile 26' to be reproduced on the printer 16 in step S5.

Then, in an entire CMYK color space (made up of all combinations of C in the range of 0–255, M in the range of 0–255, Y in the range of 0–255, and K in the range of 0–255), differences $\Delta$ (C, M, Y, K)=T1 (C, M, Y, K)–T0 (C, M, Y, K)=(X1–X0, Y1–Y0, Z1–Z0) between output colorimetric values T0 (C, M, Y, K)=X0, Y0, Z0 of the original printing profile 26 as a target and output colorimetric values T1 (C, M, Y, K)=X1, Y1, Z1 of a printing a printing color reproduction profile 26', which are produced when the image data values in the entire CMYK color space are inputted, in step S6.

In view of the color reproduction range of the printing press 7 and the color reproduction range of the printer 16, the differences $\Delta$ are multiplied by a certain weight (weighting coefficient) w in step S7. The products are added to the original printing profile 26 (actually, the products are subtracted from the original printing profile 26 because their sign is inverted), and the sum is used as a corrected printing profile 26A in step S8.

Figure 4:
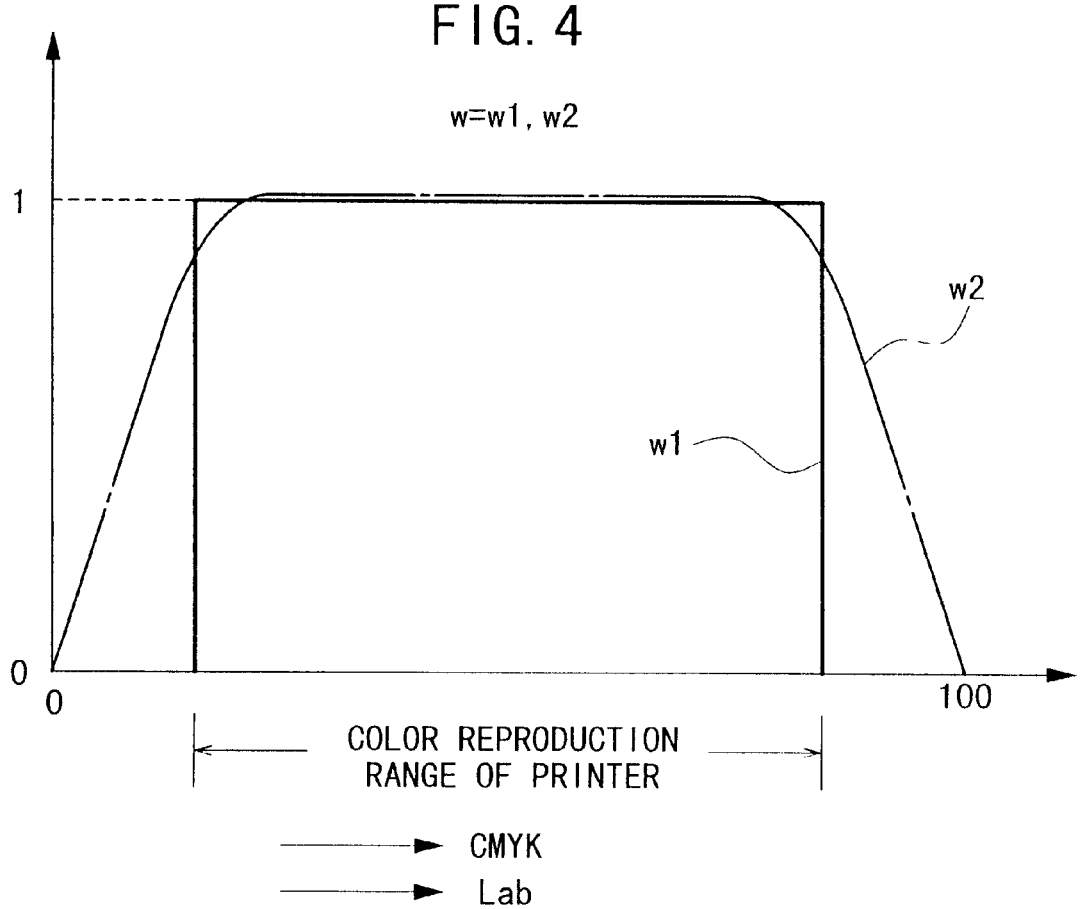
FIG. 4 is a diagram illustrative of the manner in which a weight is changed by the difference between color reproduction ranges.

As shown in FIG. 4, the weight w may be a weight w1 (C, M, Y, K) which is of a value 1 in the color reproduction range of the printer 16 and a value 0 outside the color reproduction range of the printer 16, as indicated by the solid-line curve, or may be a weight w2 (C, M, Y, K) whose value becomes gradually reduced from a value 1 to a value 0 in a direction away from the color reproduction range of the printer 16, as indicated by the dot-and-dash-line curve. In FIG. 4, the value 0% of CMYK on the horizontal axis corresponds to the value of the paper of the image reception sheet RS of the printer 16, and the value 100% of CMYK on the horizontal axis corresponds to the value of the inks of the printing press 7.

If output colorimetric values from the corrected printing profile 26A processed by the weight w=w1, w2 are represented by T2 (C, M, Y, K) and overall output colorimetric values from the corrected printing profile 26A are represented by Tout, then the output colorimetric values Tout at the weight w=w1 are determined by the following equations (1), (2):

$$Tout = T2 = T0 - 1 \times \Delta \text{ (within the reproduction range of the printer profile)} \quad (1)$$

$$Tout = T0 \text{ (outside the reproduction range of the printer profile)} \quad (2)$$

Figure 5:
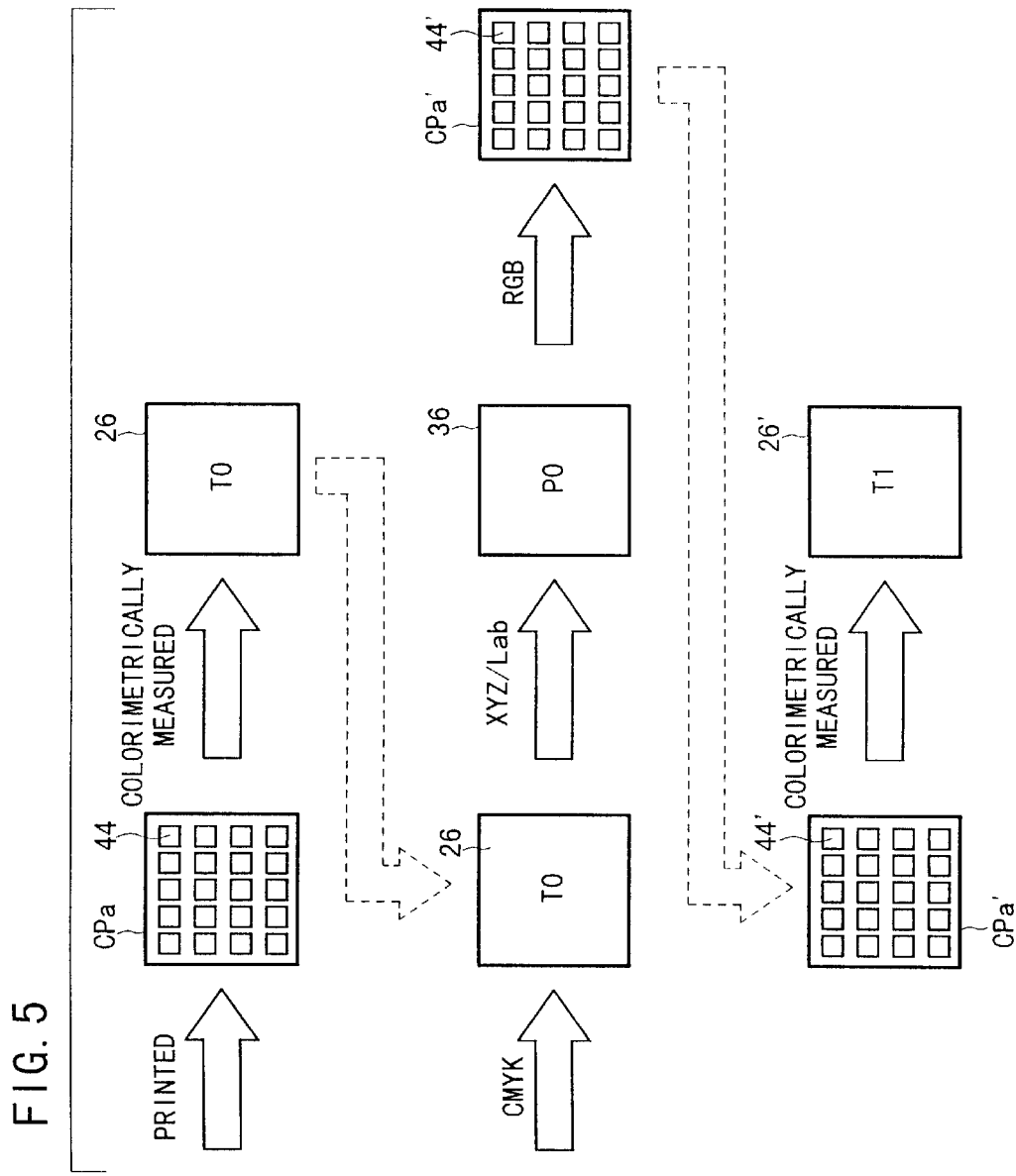
FIG. 5 is a diagram schematically showing the printing proof generating system.

In the above embodiment, as schematically shown in FIG. 5, the color patches 44 of a color chart Cpa printed by the printing press 7 are colorimetrically measured by the colorimeter 42, thereby generating an original printing profile 26 as a target having output colorimetric values T0 for converting CMYK image data into colorimetric data.

Then, based on CMYK image data when a printed color chart Cpa is generated using the original printing profile 26 and the printer profile 36 whose output RGB values are P0, the printer 16 outputs a color chart Cpa' as a proof.

The color chart Cpa' is then colorimetrically measured to generate a printing color reproduction profile 26' which has output colorimetric values T1 when the color chart Cpa printed by the printer 16 is reproduced.

Then, in view of the color reproduction ranges of the printing press 7 and the printer 16, the weight w is set to w=w1, w2, generating a corrected printed profile 26A having output colorimetric values Tout according to the equations (1), (2).

The corrected printed profile 26A and the printer profile 36 are set as a corrected color converting means 20A (see FIG. 2) of the host computer 14. Even if the image of the hardcopy HC as an output of the printer 16 suffers different color shifts in a plurality of hues with respect to the image IM on the color printer Pm as a target, it is possible to perform easily corrected color matching by using the corrected color converting means 20A.

The first embodiment has been described above. For an easier understanding of second and third embodiments to be described below, the first embodiment will be described again as Lab colorimetric values rather than XYZ colorimetric values based on the block diagram shown in FIG. 6. (In the block diagram shown in FIG. 6, blocks surrounded by dual squares represent "processing (hardware- or software-implemented processing", and blocks surrounded by a single square represent "profile" or "table" as a storage means.

Figure 6:
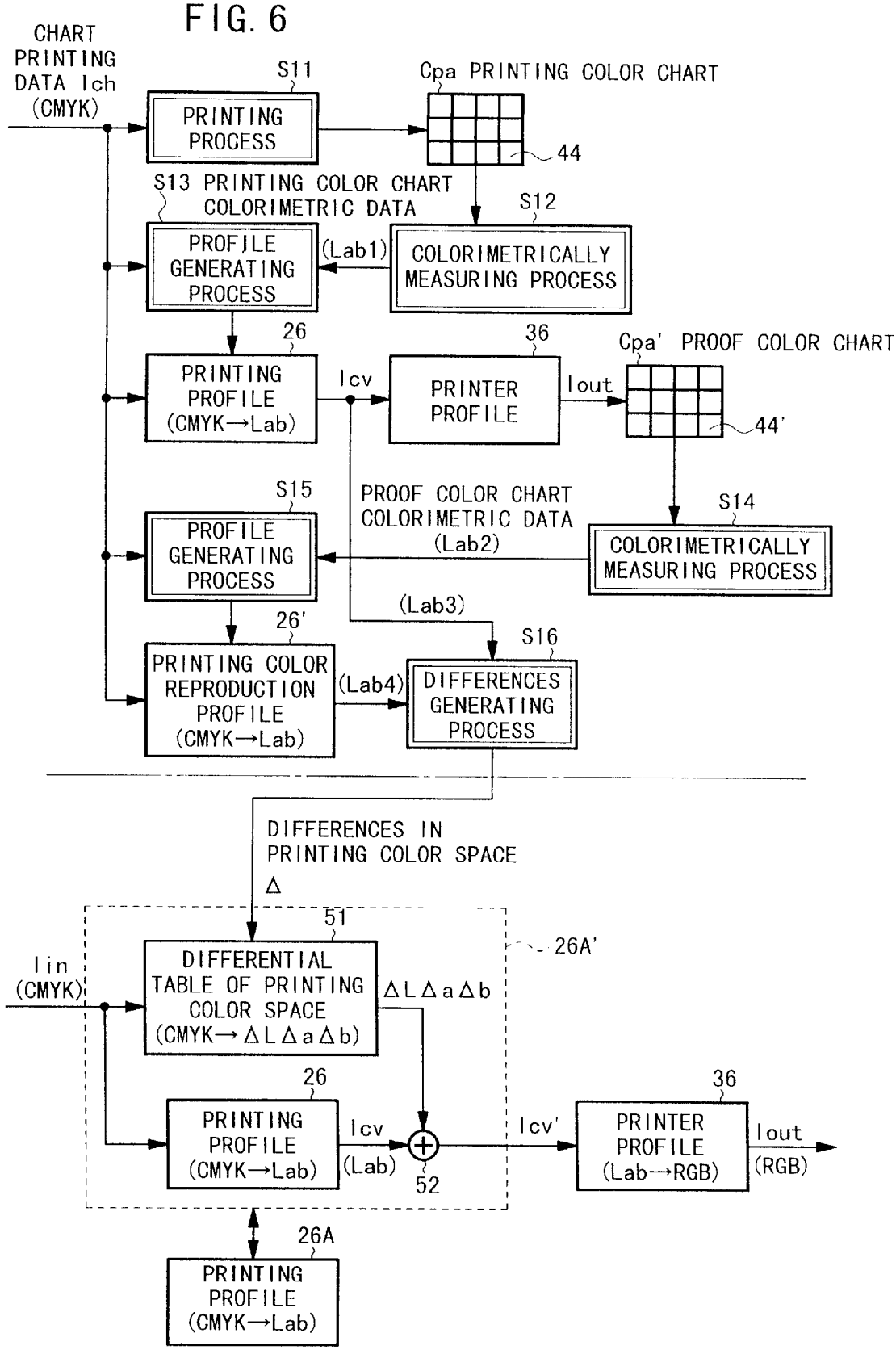
FIG. 6 is a block diagram of an arrangement of a first embodiment.

In FIG. 6, based on chart printing data Ich as input image data Iin depending on input conditions, the printing press 7 (see FIG. 1) performs a printing process in step S11 to generate a printed color chart Cpa with color patches 44 formed thereon. The number of chart print data Ich, i.e., the number of color patches 44, is several hundreds.

Then, the color patches 44 of the printed color chart Cpa are colorimetrically measured by the colorimeter 42, producing printing color chart colorimetric data Lab1 in step S12.

Then, the produced printing color chart colorimetric data Lab1 and chart printing data Ich for outputting the printing color chart Cpa are associated with each other and interpolated, generating an original printing profile 26 representing association with the output colorimetric data Icv which correspond to the input image data Iin depending on the printing conditions in the overall printing color space in step S13 (corresponding to the processing in step S2).

Then, the chart printing data Ich which are image data depending on the printing conditions for outputting the printing color chart Cpa measured when the original printing profile 26 was generated are converted into image data Iout depending on proofer conditions via the printing profile 26 and the printer profile (proofer profile) 36, and the image data Iout are supplied to the printer 16, which outputs a proof color chart Cpa' (corresponding to the processing in step S3).

Then, color patches 44' of the proof color chart Cpa' are colorimetrically measured by the colorimeter 42 in step S14 (corresponding to the processing in step S4), and a printing color reproduction profile 26' in the overall printing color space simulated by the printer 16 as a proofer from measured proof color chart colorimetric data Lab2 and the chart printing data Ich as the input image data Iin is generated by the same profile generating process as in step S13 in step S15 (corresponding to the processing in step S5).

Then, differences Δ (Lab3−Lab4=ΔLΔaΔb) between Lab colorimetric data Icv=Lab3 and Lab colorimetric data Lab4 which are produced when the input image data Iin depending on the printing conditions are passed through the printing color reproduction profile 26' and the printing profile 26 are determined with respect to the entire printing color space of the input image data Iin depending on the printing conditions in step S16 (corresponding to the processing in step S6).

A corrected printing profile 26A' is arranged such that a differential table 51 of the printing color space for converting the CMYK image data Iin thus determined into differences (differential data) Δ=ΔLΔaΔb of the Lab colorimetric data Icv (CMYK→ΔLΔaΔb) and the original printing profile 26 are added by an adder 52. The corrected printing profile 26A' is capable of producing corrected Lab colorimetric data Icv' with respect to the entire printing color space of the input image data Iin.

The differential table 51 of the printing color space can be multiplied by the weighting coefficient w1 or the weighting coefficient w2 for use.

Figure 7:
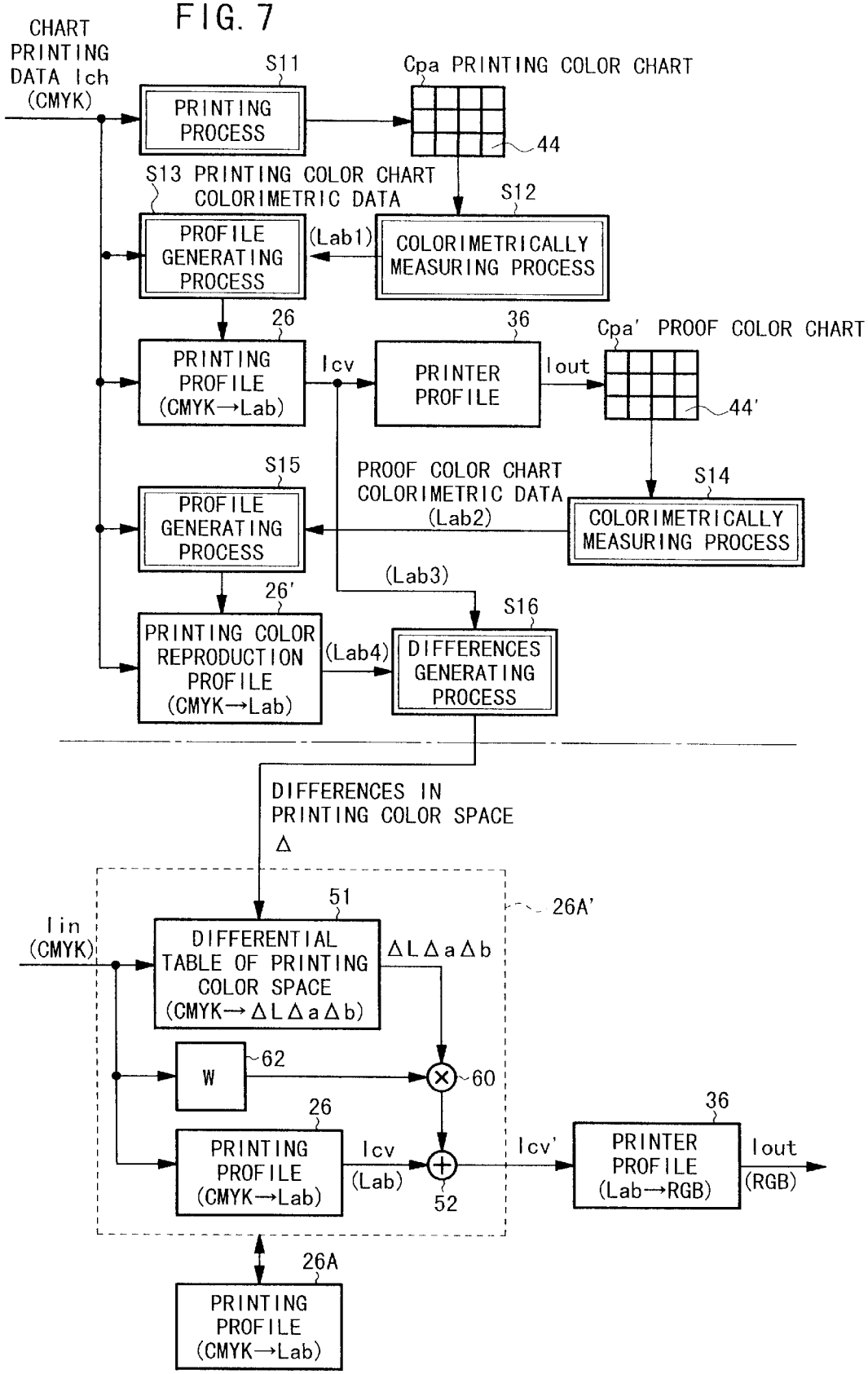
FIG. 7 is a block diagram of an arrangement of a modification of the first embodiment.

Specifically, according to a modification shown in FIG. 7, a weighting coefficient multiplier 60 may be inserted between the differential table 51 of the printing color space and the adder 52, and a table 62 storing weighting coefficients w (weighting coefficient table) may be inserted between the input image data Iin and the multiplier 60. The weighting coefficient table 62 outputs the weighting coefficient w1 or the weighting coefficient w2 shown in FIG. 4 depending on the value of the input image data Iin, and supplies the outputted weighting coefficient to an input terminal of the multiplier 60 whose other input terminal is supplied wit the differences Δ.

The printing profile 26A' which comprises the differential table 51 of the printing color space, the original printing profile 26, and the adder 52, or the printing profile 26A' which comprises the differential table 51 of the printing color space, the original printing profile 26, the weighting coefficient table 62, the multiplier 60, and the adder 52 may be unified into a single corrected printing profile 26A capable of converting CMYK input image data Iin into corrected colorimetric data Icv'.

By using the unified corrected printing profile 26A and the printer profile 36, it is possible to convert the input image data Iin in the overall printing color space into RGB image data Iout depending on corrected printer conditions.

Figure 8:
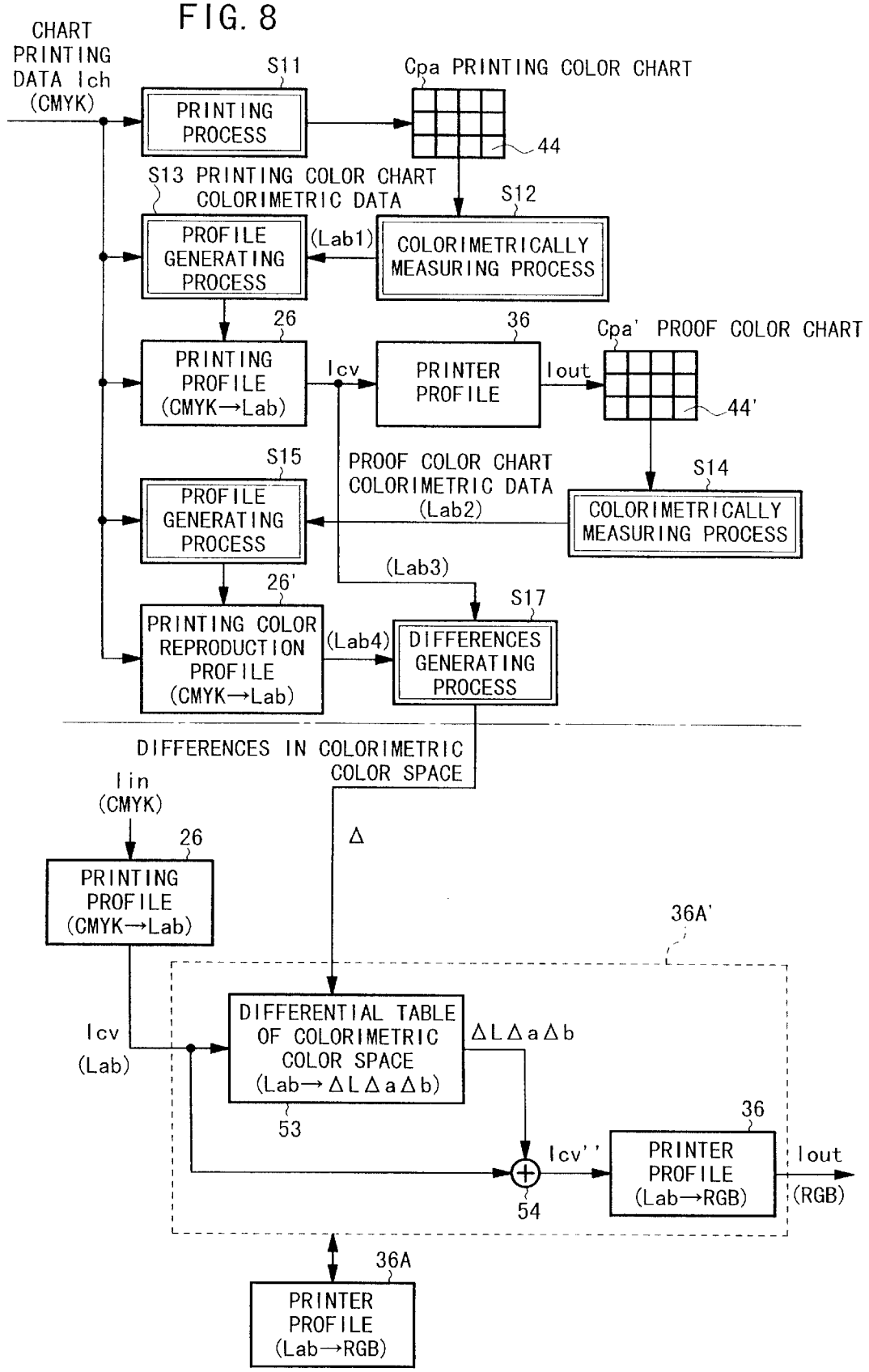
FIG. 8 is a block diagram of an arrangement of a second embodiment.

FIG. 8 is a block diagram illustrative of a second embodiment. The embodiment shown in FIG. 8 is the same as the embodiment shown in FIG. 6 with respect to the processing prior to the difference generating process in step S17.

The second embodiment shown in FIG. 8 has a difference generating process in step S17 which determines corresponding differences Δ (differences Δ corresponding to the Lab colorimetric data Icv) in the entire colorimetric space, rather than corresponding differences Δ in the entire printing color space as in the difference generating process in step S16.

A corrected printer profile 36A' is generated which comprises a differential table 53 of the colorimetric color space for converting the Lab colorimetric data Icv Iin thus determined into differential data Δ=ΔLΔaΔb (Lab→ΔLΔaΔb), an adder 54 for adding the differential data ΔLΔaΔb and the Lab colorimetric data Icv obtained by the printing profile 26, and the original printer profile 36.

The corrected printer profile 36A' is capable of producing printer-dependent image data Iout from corrected Lab colorimetric data Icv" which have been obtained with respect to the colorimetric color space of the Lab colorimetric data Icv.

Figure 9:
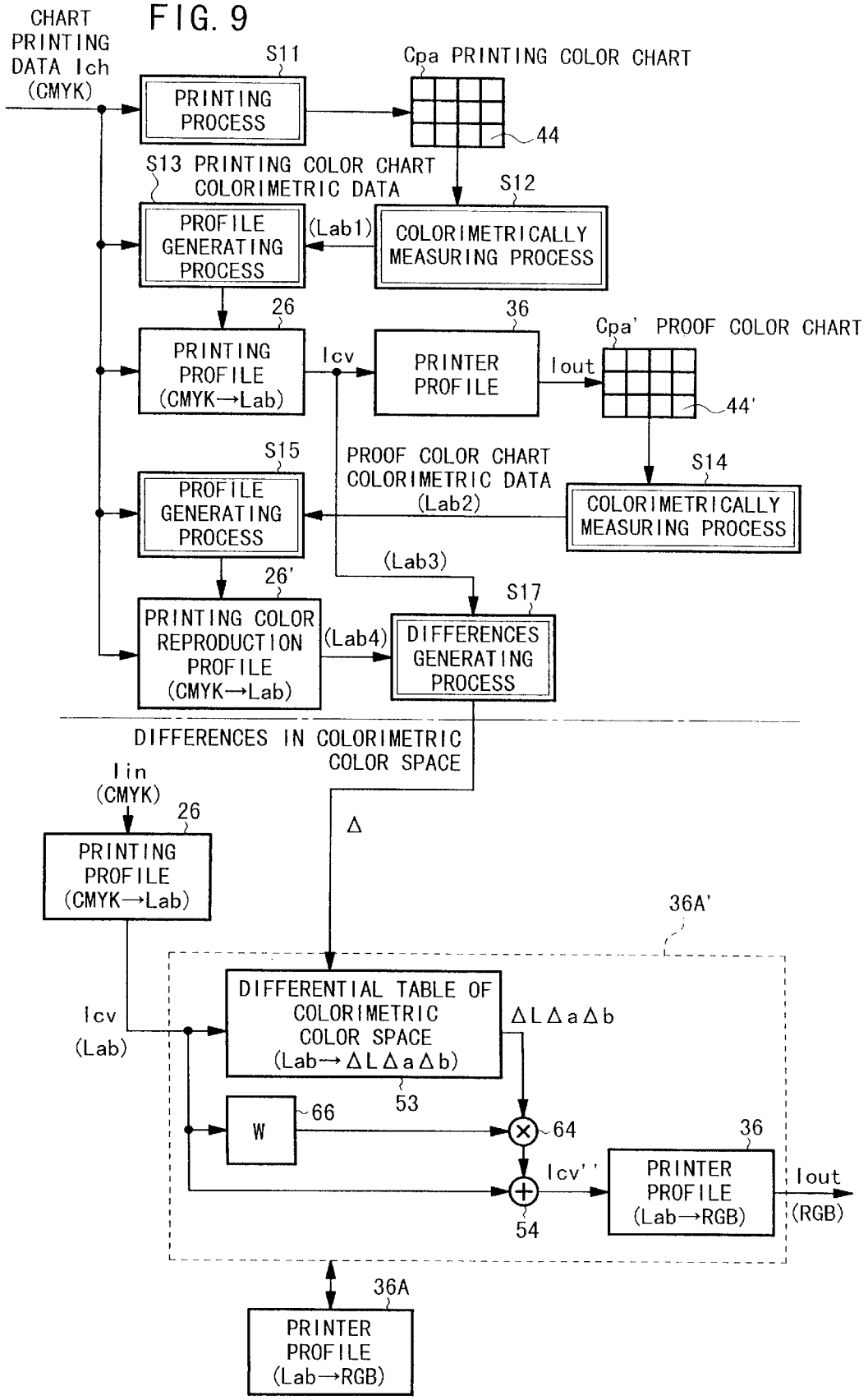
FIG. 9 is a block diagram of an arrangement of a modification of the second embodiment.

According to a modification shown in FIG. 9, a weighting coefficient table 66 and a multiplier 64 may be inserted to multiply the differential table 53 of the colorimetric color space by the weighting coefficient w1 or the weighting coefficient w2. The horizontal axis of the weighting coefficient w=w1, w2 is a Lab axis (see FIG. 4), for example, which represents colorimetric values, rather than a CMYK axis.

The differential table 53 of the colorimetric color space, the adder 54, the printer profile 36, or the differential table 53 of the colorimetric color space, the adder 54, the printer profile 36, the weighting coefficient table 66, and the multiplier 64 may be unified into a single corrected printer profile 36A capable of converting Lab colorimetric data Icv outputted from the printing profile 26 into image data Iout depending on corrected printer conditions.

By using the original printing file 26 and the unified printer profile 36A, it is possible to convert the input image data Iin in the overall printing color space into RGB image data Iout depending on corrected printer conditions.

Figure 10:
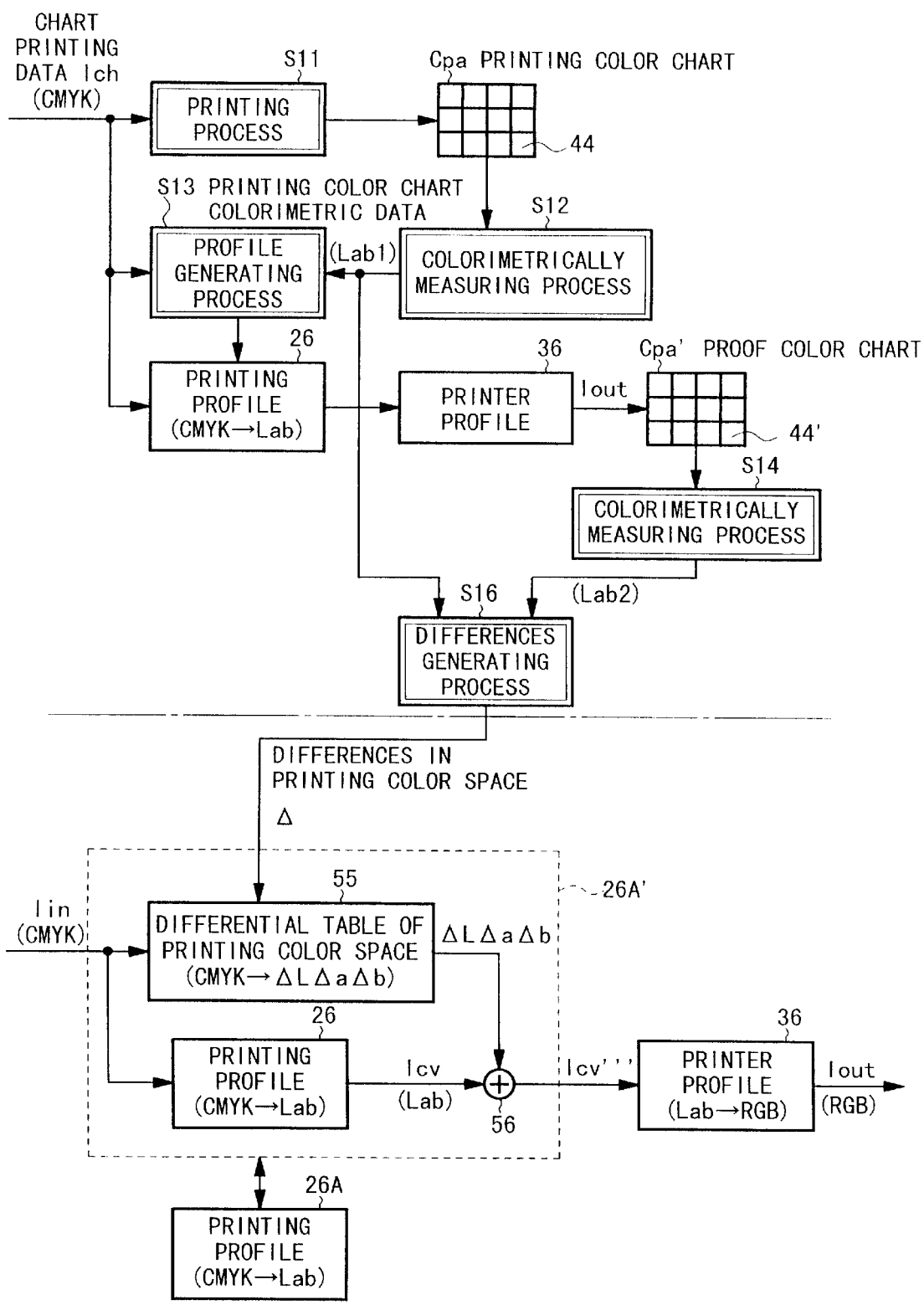
FIG. 10 is a block diagram of an arrangement of a third embodiment.

FIG. 10 is a block diagram illustrative of a third embodiment. In the first and second embodiments described above, the printing color reproduction profile 26' is generated for determining differences Δ. According to the third embodiment, differences Δ are determined without generating the printing color reproduction profile 26', stated otherwise, without using the printing color reproduction profile 26'.

In the third embodiment shown in FIG. 10, differences Δ in the entire printing color space are determined directly from the printing color chart colorimetric data Lab1 determined in step S12 and the proof color chart colorimetric data Lab2 determined in step S14.

A corrected printing profile 26A" is arranged such that a differential table 55 of the printing color space for converting the CMYK image data Iin thus determined into colorimetric data ΔLΔaΔb (CMYK→ΔLΔaΔb) and the original printing profile 26 are added by a combiner 56. The corrected printing profile 26A" is capable of producing corrected colorimetric data Icv''' with respect to the entire printing color space of the input image data Iin.

Figure 11:
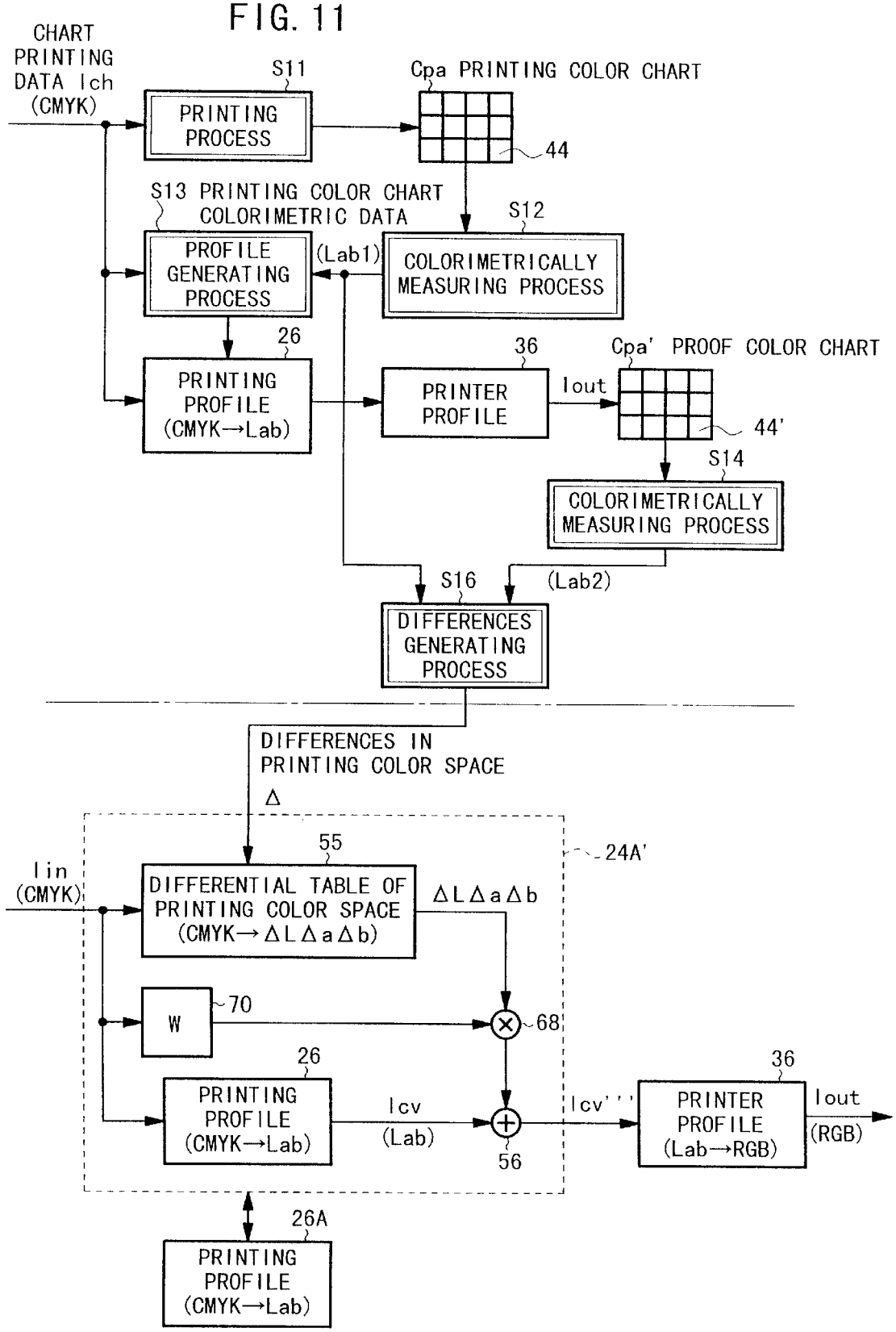
FIG. 11 is a block diagram of an arrangement of a modification of the third embodiment.

According to a modification shown in FIG. 11, a weighting coefficient table 70 and a multiplier 68 may be inserted to multiply the differential table 55 of the colorimetric color space by the weighting coefficient w1 or the weighting coefficient w2.

As shown in FIGS. 10 and 11, the printing profile 26A" comprising the differential table 55 of the colorimetric color space, the original printing profile 26, and the combiner 56, or the differential table 55 of the colorimetric color space, the original printing profile 26, the combiner 56, the weighting coefficient table 70, and the multiplier 68 may be unified into a single corrected printing profile 26A.

With the corrected printing profile 26A and the printer profile 36, it is possible to convert the input image data Iin in the overall printing color space into image data Iout (RGB) depending on corrected printer conditions.

In the embodiment shown in FIG. 11, because no printing color reproduction profile 26' is generated, the profile generating process in step S15 is not required. Even if the algorithm of the profile generating process in steps S13, S15 is an algorithm corresponding to several hundred input data, when the number of color patches 44 of the color charts Cpa, Cpa' is increased without being limited by the number of several hundred input data, the differential table 55 of the printing color space can be generated from differences $\Delta$ corresponding to the overall increased number of patches 44. As a result, it is possible to produce a hardcopy HC whose colors are closer to those of the print Pm, i.e., whose printing color reproduction accuracy is good in the simulation of the print Pm.

According to the present invention, as described above, the colors of a proof outputted from the proofer can be equalized with the colors of a print as a target simply, reliably, and more accurately.

Specifically, a color chart corresponding to a printed color chart is outputted as a proof from a printing proofer. The proof is colorimetrically measured to determine a conversion relationship between image data depending on a device as the printing proofer and the colorimetric data, i.e., a printing profile of the proofer (also referred to as "printing color reproduction profile"). Differences between the printing color reproduction profile and an original printing profile are determined in a printing color space, and added to the original printing profile (actually, the differences are subtracted from the original printing profile because their sign is inverted). The sum is used as a new corrected printing profile.

By using the corrected printing profile, therefore, if a plurality of colors, whose hues are close to each other, of the proof outputted from the proofer are shifted differently from those of a print as a target, then the colors of the proof can easily and reliably be equalized with the colors of the print as the target, which it has heretofore been difficult to correct through adjustments of tone curves of the respective colors.

According to the present invention, the above differences are determined in the colorimetric color space, rather than the printing color space, and added to the original proofer profile (actually, the differences are subtracted from the original printing profile because their sign is inverted). The sum is used as a new corrected printing profile.

By using the corrected printing profile, therefore, if a plurality of colors, whose hues are close to each other, of the proof outputted from the proofer are shifted differently from those of a print as a target, then the colors of the proof can easily and reliably be equalized with the colors of the print as the target, which it has heretofore been difficult to correct through adjustments of tone curves of the respective colors.

According to the present invention, furthermore, a color chart corresponding to a color chart printed to generate a printing profile is outputted as a proof from a printing proofer. The proof and the printed color chart are colorimetrically measured to determine colorimetric differences in a printing color space, and added to the original printing profile (actually, the differences are subtracted from the original printing profile because their sign is inverted). The sum is used as a new corrected printing profile.

With the above arrangement, if a plurality of colors, whose hues are close to each other, of the proof outputted from the proofer are shifted differently from those of a print as a target, then the colors of the proof can easily and reliably be equalized with the colors of the print as the target, which it has heretofore been difficult to correct through adjustments of tone curves of the respective colors.

Industrial Applicability

As described above, the color correcting method according to the present invention is preferably applicable to simulating, with high color reproduction accuracy, the colors of a print produced by a printing press with a proofer such as a printer or the like before the print is actually produced.

What is claimed is:

1. A color correcting method for converting input image data (Iin) depending on printing conditions into colorimetric data (Icv) with a printing profile (26), thereafter converting the colorimetric data into image data (Iout) depending on proofer conditions with a proofer profile (36), and outputting a proof (HC) from a proofer (16) based on the image data to simulate color reproduction accuracy, comprising the steps of:

converting image data (Ich) depending on the printing conditions to output a printing color chart (Cpa) colorimetrically measured when the printing profile is produced, into image data depending on the proofer conditions via said printing profile and said proofer profile;

supplying said image data to said proofer to output a proof color chart (Cpa') from said proofer;

colorimetrically measuring said proof color chart to generate a printing color reproduction profile (26') to be simulated by said proofer (S14), (S15);

determining differences ($\Delta$) between said printing color reproduction profile and said printing profile for an entire color space of said input image data depending on the printing conditions (S16);

correcting said colorimetric data with the determined differences, and generating a corrected printing profile from said corrected colorimetric data.

2. A color correcting method according to claim 1, wherein said step of correcting said colorimetric data with the determined differences comprises the steps of:

adding said determined differences to said printing profile to correct the printing profile, and correcting said colorimetric data with the corrected printing profile.

3. A color correcting method according to claim 1, wherein said step of correcting said colorimetric data with the determined differences comprises the steps of:

multiplying the determined differences by a weighting coefficient (w) depending on values of the input image data depending on the printing conditions in said entire color space, adding the differences multiplied by said weighting coefficient to said printing profile to correct the printing profile, and correcting said colorimetric data with the corrected printing profile.

4. A color correcting method for converting input image data (Iin) depending on printing conditions into colorimetric data (Icv) with a printing profile (26), thereafter converting the colorimetric data into image data (Iout) depending on proofer conditions with a proofer profile (36), and outputting a proof (HC) from a proofer (16) based on the image data to simulate color reproduction accuracy, comprising the steps of:

converting image data (Ich) depending on the printing conditions to output a printing color chart (Cpa) colorimetrically measured when the printing profile is produced, into image data depending on the proofer conditions via said printing profile and said proofer profile;

supplying said image data to said proofer to output a proof color chart (Cpa') from said proofer;

colorimetrically measuring said proof color chart to generate a printing color reproduction profile (26') to be simulated by said proofer;

determining differences ($\Delta$) between said printing color reproduction profile and said printing profile for an entire color space which is a color space of colorimetric data (S17);

correcting said colorimetric data with the determined differences; and generating a corrected printing profile from said corrected colorimetric data.

5. A color correcting method according to claim 4, wherein said step of correcting said image data depending on the proofer conditions with the determined differences comprises the steps of:

determining corrected colorimetric data (Icv") in said colorimetric color space from said determined differences and said printing profile, correcting said proofer profile with said corrected colorimetric data, and correcting said image data depending on the proofer conditions with the corrected proofer profile.

6. A color correcting method according to claim 4, wherein said step of correcting said image data depending on the proofer conditions with the determined differences comprises the steps of:

determining corrected colorimetric data in said colorimetric color space from said determined differences and said printing profile, correcting said proofer profile with corrected colorimetric data produced by multiplying the determined corrected colorimetric data by a weighting coefficient (w) depending on said colorimetric color space, and correcting said image data depending on the proofer conditions with the corrected proofer profile.

7. A color correcting method for converting input image data (Iin) depending on printing conditions into colorimetric data (Icv) with a printing profile (26), thereafter converting the colorimetric data into image data (Iout) depending on proofer conditions with a proofer profile (36), and outputting a proof (HC) from a proofer (16) based on the image data to simulate color reproduction accuracy, comprising the steps of:

converting image data (Ich) depending on the printing conditions to output a printing color chart (Cpa) colorimetrically measured when the printing profile is produced, into image data depending on the proofer conditions via said printing profile and said proofer profile;

supplying said image data to said proofer to output a proof color data (Cpa') from said proofer;

colorimetrically measuring said proof color chart to determine colorimetric data;

determining differences (Δ) between colorimetric data of said printing color chart and the colorimetric data of said printing color chart for an entire color space of said input image data depending on the printing conditions (S16);

correcting said colorimetric data with the determined differences; and generating a corrected printing profile from said corrected colorimetric data.

8. A color correcting method according to claim 7, wherein said step of correcting said colorimetric data with the determined differences comprises the steps of:

adding said determined differences to said printing profile to correct the printing profile, and correcting said colorimetric data with the corrected printing profile.

9. A color correcting method according to claim 7, wherein said step of correcting said colorimetric data with the determined differences comprises the steps of:

multiplying the determined differences by a weighting coefficient (w) depending on values of the input image data depending on the printing conditions in said entire color space, adding the differences multiplied by said weighting coefficient to said printing profile to correct the printing profile, and correcting said colorimetric data with the corrected printing profile.

10. A color correcting method according to any one of claims 3, 6, 9, wherein said weighting coefficient has a value of 1 in a color reproduction range of said printing proofer, and a value of 0 outside said color reproduction range.

11. A color correcting method according to any one of claims 3, 6, 9, wherein said weighting coefficient (w2) has a value of 1 in a color reproduction range of said printing proofer, and is gradually reduced from the value of 1 in a direction away from said color reproduction range.

12. The color correcting method according to claim 1, wherein said printing profile and said printing color reproduction profile are based on colorimetric measurements of said input image data that is changed incrementally, wherein said incremental changes to said input image data are at 10 percent increments.

13. The color correcting method according to claim 4, wherein said printing profile and said printing color reproduction profile are based on colorimetric measurements of said input image data that is changed incrementally, wherein said incremental changes to said input image data are at 10 percent increments.

14. The color correcting method according to claim 7, wherein said proof color chart and said printing color chart are based on colorimetric measurements of said input image data that is changed incrementally, wherein said incremental changes to said input image data are at 10 percent increments.

15. The color correcting method according to claim 1, wherein said difference (Δ) between said printing color reproduction profile and said printing profile is determined in a device independent space.

16. The color correcting method according to claim 15, wherein said device independent space is XYZ.

17. The color correcting method according to claim 16, wherein said proofer profile includes conversion to RGB color data.

18. The color correcting method according to claim 4, wherein said difference (Δ) between said printing color reproduction profile and said printing profile is determined in a device independent space.

19. The color correcting method according to claim 18, wherein said device independent space is XYZ.

20. The color correcting method according to claim 19, wherein said proofer profile includes conversion to RGB color data.

* * * * *